United States Patent
Menon et al.

(10) Patent No.: US 6,343,343 B1
(45) Date of Patent: Jan. 29, 2002

(54) DISK ARRAYS USING NON-STANDARD SECTOR SIZES

(75) Inventors: Jaishankar Moothedath Menon; John Davis Palmer, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,472

(22) Filed: Jul. 31, 1998

(51) Int. Cl.[7] .......................... G06F 12/06; G06F 12/00
(52) U.S. Cl. ..................... 711/114; 711/113; 711/155; 711/202
(58) Field of Search ................ 711/114, 113, 711/155; 709/309; 360/51

(56) References Cited

U.S. PATENT DOCUMENTS

| | | | |
|---|---|---|---|
| 4,858,034 A | * 8/1989 | Hassel et al. | 360/51 |
| 5,130,992 A | 7/1992 | Frey, Jr. et al. | |
| 5,191,584 A | 3/1993 | Anderson | |
| 5,208,813 A | 5/1993 | Stallmo | |
| 5,301,297 A | 4/1994 | Menoen et al. | |
| 5,388,108 A | 2/1995 | DeMoss et al. | |
| 5,410,667 A | * 4/1995 | Belsan et al. | 711/114 |
| 5,526,482 A | 6/1996 | Stallmo et al. | |
| 5,530,830 A | 6/1996 | Iwasaki et al. | |
| 5,537,567 A | 7/1996 | Galbraith et al. | |
| 5,550,998 A | 8/1996 | Willis et al. | |
| 5,551,002 A | 8/1996 | Rosich et al. | |
| 5,579,474 A | 11/1996 | Kakura et al. | |
| 5,581,724 A | * 12/1996 | Belsan et al. | 711/114 |
| 5,600,816 A | * 2/1997 | Oldfield et al. | 711/113 |
| 5,613,085 A | 3/1997 | Lee et al. | |
| 5,613,088 A | * 3/1997 | Achiwa et al. | 711/155 |
| 5,636,359 A | 6/1997 | Beardsley et al. | |
| 5,687,353 A | * 11/1997 | Chen et al. | 711/155 |
| 5,978,856 A | * 11/1999 | Jones | 709/301 |
| 6,021,463 A | * 2/2000 | Belser | 711/114 |

OTHER PUBLICATIONS

Menon, J. et al, Research Report, "The Architecture of a Fault–Tolerant Cached RAID Controller", IBM Research Division, Published at 20th Annual International Symposium on Computer Architecture, San Diego, California, May 1993, pp. 76–86.

Menon, J. et al., "Algorithms for Software and Low–cost Hardware RAIDs", IBM Almaden Research Center, IEEE, 1995, pp. 411–418.

Patterson, D.A. et al., "A Case for Redundant Arrays of Inexpensive Disks (RAID)", ACM, 1988, pp. 109–116.

Riegel, J. et al., "Performance of Recovery Time Improvement Algorithms for Software RAIDs", IBM Almaden Research Center, IEEE, 1996, pp. 56–65.

Patterson et al., "A Case for redundant Arrays of Inexpensive disks (RAID)", 1988, pp. 113–114.*

* cited by examiner

Primary Examiner—Matthew Kim
Assistant Examiner—Brian R. Peugh
(74) Attorney, Agent, or Firm—Gates & Cooper LLP

(57) ABSTRACT

A method, apparatus, article of manufacture, and a memory structure for storing and retrieving data in physical sectors which are larger than the sector size presented to the user is disclosed. The method comprises the steps of receiving at least one user sector comprising write data, and writing the user sector to a portion of the physical sector of the storage device. In one embodiment, data is written to the data storage disk using existing data that was read from the storage disk for a RAID parity calculation.

34 Claims, 7 Drawing Sheets

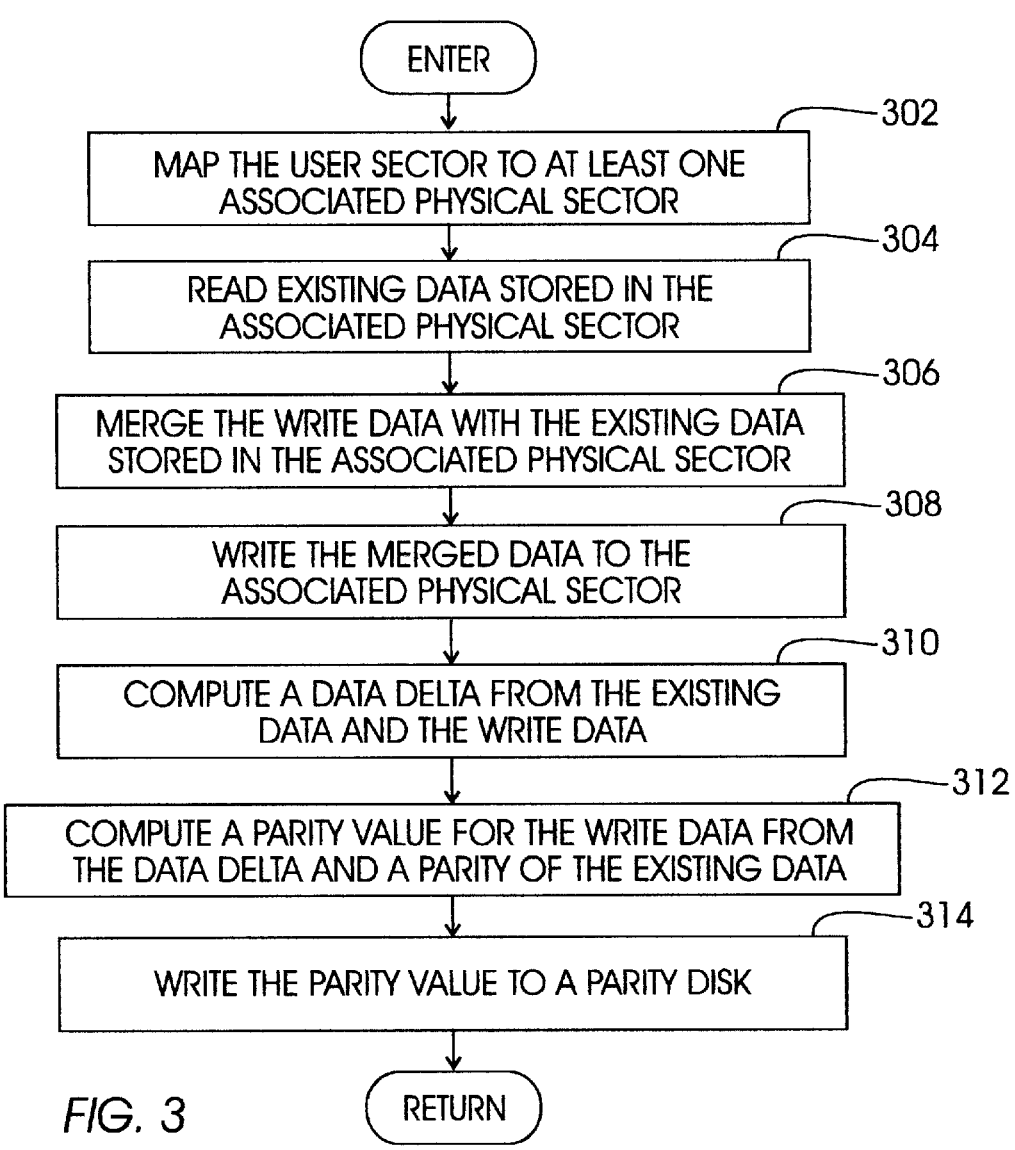

DISK ARRAYS USING NON-STANDARD SECTOR SIZES

BACKGROUND OF THE INVENTION

1. Field of the Invention

The present invention relates to data storage systems, and in particular, to a method and apparatus for storing and retrieving data in hard disk data sectors of non-standard sizes.

2. Description of the Related Art

The ability to manage massive amounts of information in large scale databases has become of increasing importance in recent years. As businesses begin to rely more heavily on large scale database management systems, the consequences of hardware-related data losses intensify, and the security, reliability, and availability of those systems becomes paramount.

One way to increase the security, reliability and availability of data stored in large databases is to employ a technology known as a redundant array of inexpensive disks, or RAID. This technique is described in the paper "A Case for Redundant Array of Inexpensive Disks (RAID)," by David A. Patterson, Garth Gibson, and Randy H. Katz, and given at the ACM Sigmod Conferencce 1988, pages 109–116 (1988), which is herein incorporated by reference.

At least five RAID "levels" have been defined. RAID-0 writes data across the drives in the array, one segment at a time. This is also referred to as a "striped" configuration. Striping offers high I/O rates since read and write operations may be performed simultaneously on multiple drives. RAID-0 does not increase reliability, since it does not provide for additional redundancy.

RAID-1 writes data to two drives simultaneously. If one drive fails, data can still be retrieved from the other member of the RAID set. This technique is also known as "mirroring." Mirroring is the most expensive RAID option, because it doubles the number of disks required, but it offers high reliability.

In RAID-2, each bit of a data word is written to a data disk drive, and its Hamming error correcting code (ECC) is recorded on an ECC disk. When the data is read, the ECC verifies the correct data or corrects single disk errors.

In RAID-3, the data block is striped and written on the data disk. Stripe parity is generated on writes, recorded on a parity disk, and checked on read operations. RAID-3 provides high read and write transfer rates, and a low ratio of parity disks, but can yield a transaction rate that does not exceed that of a single disk drive. The controller implementing a RAID-3 array may be implemented in hardware or software. Software RAID-3 controllers are difficult to implement, and hardware RAID-3 controllers are generally of medium complexity.

In RAID-4, each entire block is written on a data disk. Parity for blocks of the same rank are generated for data writes and recorded on a parity disk. The parity data is checked on read operations. RAID-4 provides a high read data transaction rate, but can require a complex controller design. RAID-4 arrays generally have a low write transaction rate and it can be difficult to rebuild data in the event of a disk failure.

In RAID-5, each data block is written on a data disk. Parity for blocks in the same rank is generated on write operations, and recorded in locations distributed among the storage disks. Parity is checked during read operations. RAID-S is similar to RAID-3, except that the parity data is spread across all drives in the array. RAID-5 offers high read transaction rates. Disk failures can compromise throughput, however, and RAID-5 controllers can be difficult to implement.

A RAID-5 array presents its storage to the user in terms of user sectors which are typically 512 bytes in size, and actually writes data on the surface of the storage disks to these user sectors. In many cases, a few bytes of control information are appended to the user sectors, but individual sectors are written to independently.

Unfortunately, this 512 byte size does not efficiently use the storage disk surface, thus reducing disk capacity from the theoretical ideal by ten percent or more. Further, limiting data sector sizes to 512 bytes has also negatively impacted the performance of computer operating systems.

In view of the foregoing, it can be seen that permitting larger sector sizes promises significant storage and throughput performance improvements. However increasing sector sizes can substantially increase the associated read/write overhead, thus decreasing read/write data throughput. For example, if a user writes a single 512 byte sector in the middle of a longer 4096 byte sector, the existing data in the sector must be read (4096 bytes), the new 512 byte data inserted, and the larger block written back to the disk. The read operation is the source of additional overhead which decreases performance. What is needed is a data storage system and method which can implement larger sector sizes in RAID architectures without unduly increasing associated read/write overhead. The present invention satisfies that need.

SUMMARY OF THE INVENTION

To address the requirements described above, the present invention discloses a method, apparatus, article of manufacture., and a memory structure for storing and retrieving data in physical sectors which are larger than the sector size presented to the user. The method comprises the steps of receiving at least one user sector comprising write data, and writing the user sector to a portion of the physical sector of the storage device. In one embodiment, data is written to the data storage disk using existing data that was read from the storage disk for a RAID parity calculation. In writing the data in this way, larger sector sizes can be implemented with no overhead penalty. To write user sectors to a portion of the physical sector of the storage device, user sectors are mapped to associated physical sectors. Existing data stored in the associated physical sectors is then read, the write data is merged with the existing data stored in the associated physical sector, and the merged data is written to the storage device. In one embodiment, the method further comprises the steps of computing a data delta from the existing data and the write data, computing a parity value for the write data from the data delta and a parity of the existing data, and writing the write data to the mapped physical sector.

The apparatus comprises a plurality of storage devices, each comprising media segmented into a plurality of physical sectors, operatively coupled to a controller. The controller manages the storage and retrieval of data in the storage devices and comprises an I/O module for writing user sectors to physical sectors. The article of manufacture comprises a data storage device tangibly embodying instructions to perform the method steps described above. The present invention also describes a memory for storing data in a RAID array of storage disks. The memory is structured into a plurality of physical sectors, typically 4096 bytes long, each of which is associable via a mapping with eight 512 byte user sectors. Data is written to the physical sectors using existing data read from a storage disk during the RAID parity calculation.

The foregoing allows writing data to disks in larger data sectors, thereby increasing the utilization of the disk media. This larger sector size is nominally 4096 bytes, but may be any multiple of the user-visible sector size.

BRIEF DESCRIPTION OF THE DRAWINGS

Referring now to the drawings in which like reference numbers represent corresponding parts throughout:

FIG. 2 is a flow chart showing the operations used to practice one embodiment of the present invention;

FIG. 3 is a flow chart showing the operations performed in writing data to a data storage device;

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
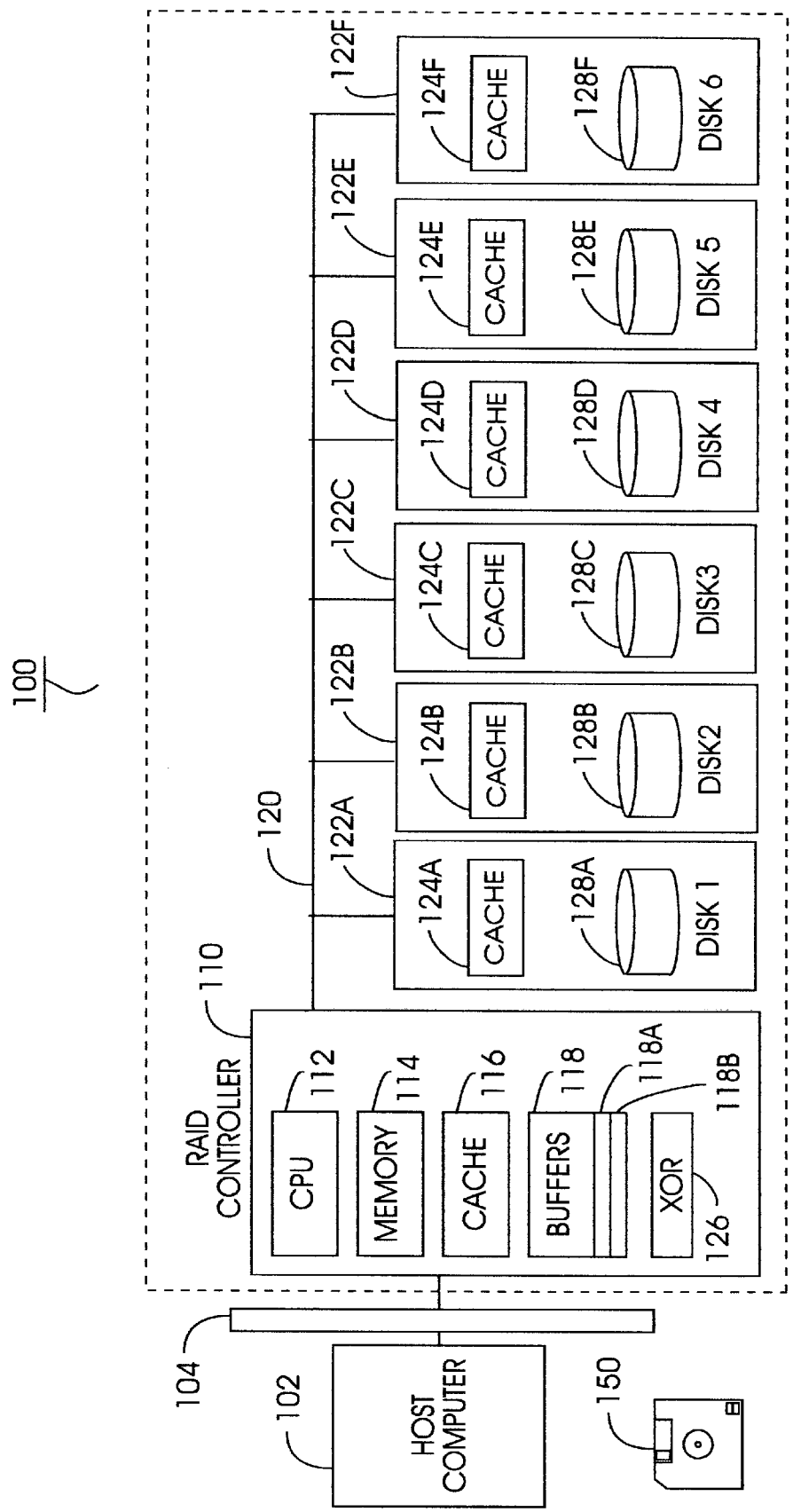
FIG. 1 is a block diagram of a host computer coupled to a RAID array.

FIG. 1 is a block diagram showing a hardware environment implementing one embodiment of the present invention. A RAID array 100 accepts commands from a host computer 102 via an interconnecting bus 104. These commands comprise, inter alia, commands to write data to the RAID array 100 and commands to read data from the RAID array 100. Ordinarily, the smallest unit of data that can be written to and read from the RAID array 100 is one user sector, typically 512 bytes. One or more host computers 102 could be interconnected with the RAID array 100, and to other RAID arrays and other devices via a local area network, wide area network, internet, or other means of providing communications.

The host computer 102 accepts a program storage device 150 which tangibly embodies program steps to perform processor instructions. The program storage device can include a CD ROM, read/writeable CD ROM, floppy disk, tape drive, magneto-optical storage apparatus, or similar device.

The RAID array 100 comprises a RAID controller 110 communicatively coupled to a plurality of storage units 122A, 122B, 122C, 122D, 122E, and 122F (hereinafter collectively referred to as storage units 122). Typically, these units are inexpensive hard drives, but the subject invention can be practiced with a wide variety of read/writeable storage devices. The RAID controller 111) 1/0 module writes to, reads from, and recovers data from storage units 122. This functionality can be implemented in RAID controller 110 hardware, or can be implemented by a RAID controller CPU 112, using instructions stored in the memory RAID controller memory 114. RAID functionality can also be implemented in the host computer 102. The RAID controller 110 also includes a cache 116 for temporarily storing data to be written to or read from the storage units, a plurality of buffers 118, including first buffer 118A and second buffer 118B, and an EXCLUSIVE OR unit 126 for performing parity calculations in accordance with RAID techniques. Although the EXCLUSIVE OR unit 126 and buffers 118 are depicted as a part of the RAID controller 110, the present invention may also be practiced by implementing an EXCLUSIVE OR unit 126, and/or buffers 118 in each data storage device 122.

Each storage unit 122 comprises media device 128 such as a hard disk, and a storage unit cache 124 for temporarily storing data for rapid storage and retrieval. The media device can include a magnetic hard disk, a magneto-optical storage device, a CD ROM, read/writeable CD ROM, tape drive, or similar device. Ordinarily, each storage unit comprises a storage media that is segmented into physical sectors of 512 bytes. In the present invention, however, physical sector sizes can be a multiple of the user sector size. In one embodiment, the media of the data storage units 122 of the present invention comprise a plurality of 4096 byte physical sectors. These are eight times the usual logical user sector size of 512 bytes.

Process

FIG. 2 is a flow chart showing the operations used to practice one embodiment of the present invention. First, write data in at least one user sector is received 202 from the host computer 102. Next, the user sector is written to a portion of a physical sector of a data storage device such as a media device 128. This step is illustrated in block 204. As will be described in further detail below, the write data may span a number of user sectors, and the data written to the storage device may span multiple physical sectors. In one embodiment, the size of the physical sectors is a multiple of the user sector size, and the writing is accomplished by using the existing data that was read from the media device in order to perform a RAID parity calculation.

FIG. 3 is a flow chart illustrating the operations used in writing the write data to a data storage device in greater detail. First, the user sectors associated with the write data are mapped into an associated physical sector on the media device 128. This is illustrated in block 302. Then the existing data stored in the associated physical sector is read 304. In block 306, the write data is merged with the existing data stored in the associated physical sector. The merged data is then written 308 to the associated physical sector. A data delta is computed from the existing data and the write data, and a parity value for the write data is computed from the data delta and the parity of the existing data. This is shown in blocks 310 and 312. Finally, the parity value so calculated is written 314 to a parity disk.

Figure 4:
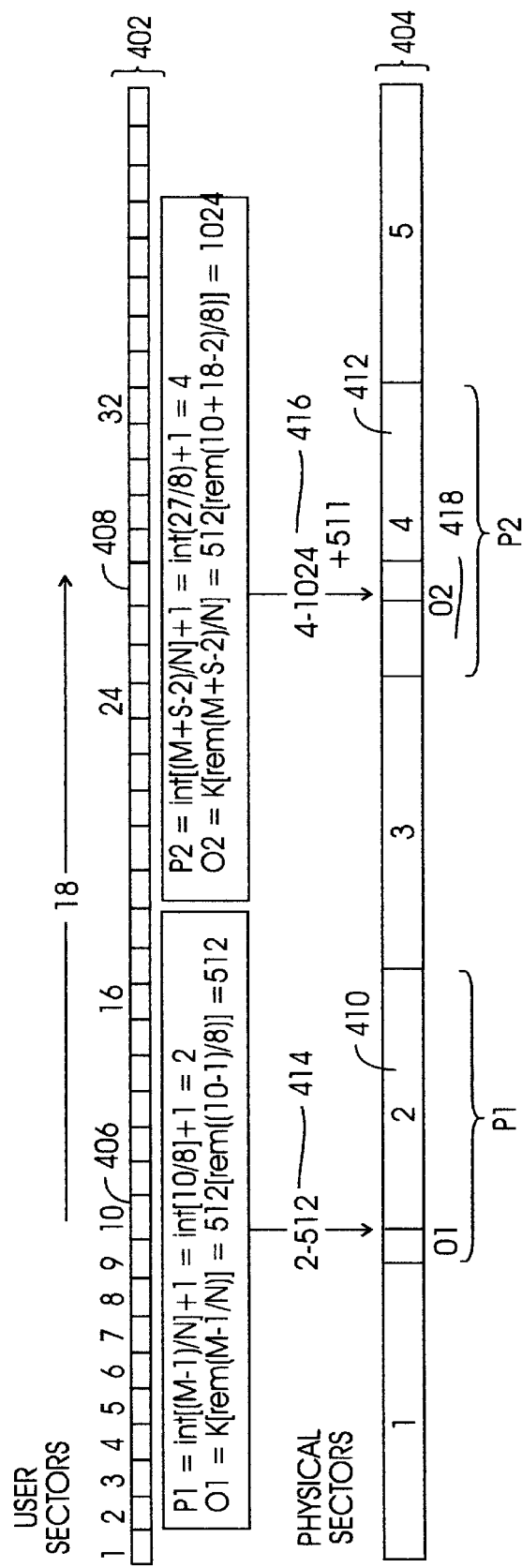
FIG. 4 is a flow chart illustrating the operations performed in mapping the user sectors associated with the write data to associated physical sectors on media devices.
Figure 5:
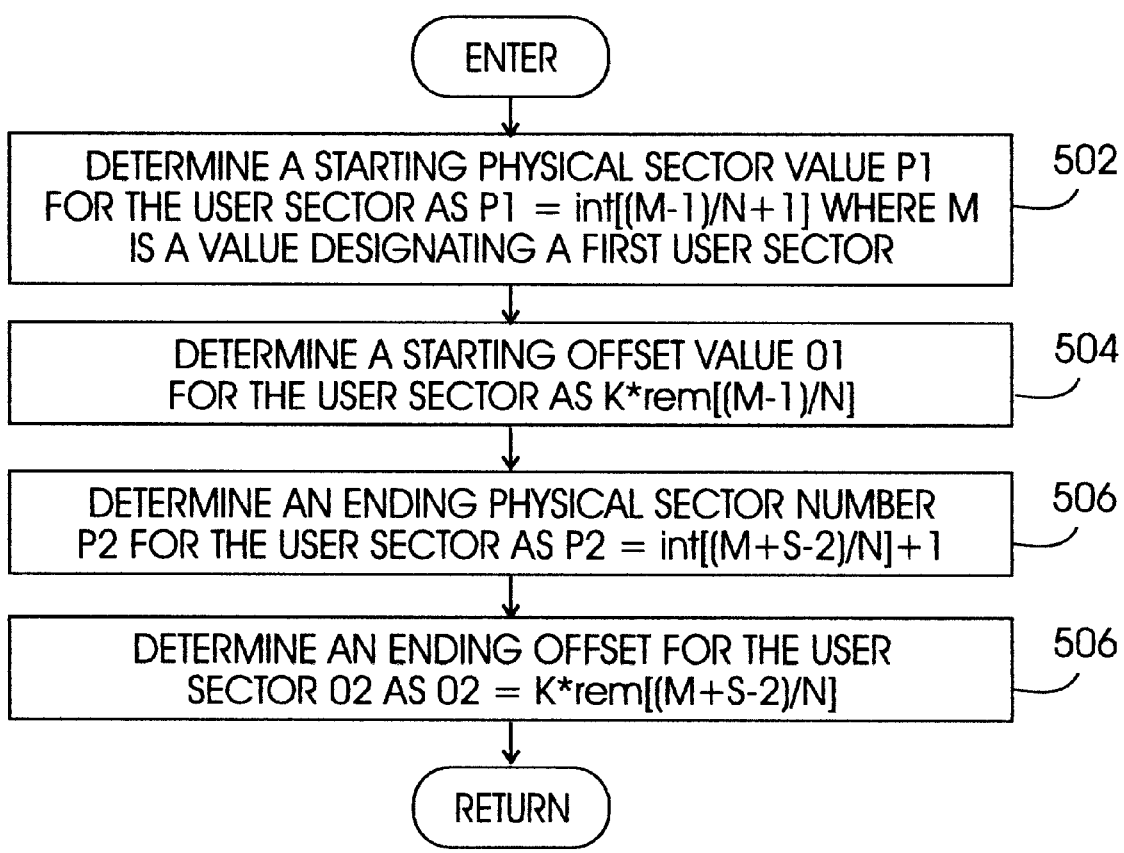
FIG. 5 is a diagram showing the mapping process with the user and physical sectors.

FIGS. 4 and 5 are diagrams illustrating the operations performed in mapping the user sectors associated with the write data to associated physical sectors on the media device 128.

FIG. 4 shows a representation of the user sectors and the associated physical sectors, and the mapping process. Write requests received from the host computer 102 are associated with one or more user sectors 402 which ordinarily represent the physical data storage locations on the media devices 128 where the write data is stored. However, the present invention maps the user sectors 402 corresponding to the write request to physical sectors 404, which are contiguous blocks where the data is actually physically written on the media device 128. Each physical sector can be associated with N user sectors 402, each typically comprising 512 byte blocks of data. In the illustrated example, each physical sector 404 is associated with 8 user sectors 402, and write request is received from the host computer to write data to S user sectors beginning with user sector M 406.

FIG. 5 is a flow chart showing the process for mapping the beginning user sector 406 and the ending user sector to associated physical sectors 404. First, a starting physical sector value P1 is determined for the associated user sector M. This is illustrated in block 502, and is defined by the relation:

$$P1 = \text{int}\left[\frac{(M-1)}{N}\right] + 1$$

where int(•) is a function that returns the largest integer not exceeding the argument (•). In the example illustrated in FIG. 4, M=10, and N=8. Therefore, $$P1 = \text{int}[1.25] + 1 = 2$$

Next, a value for the starting offset O1 is determined from the user sector. This is illustrated in block 504 of FIG. 5, and is determined from the relation:

$$O1 = K * \text{rem}\left[\frac{(M-1)}{N}\right]$$

where the function rem(•) returns the fractional portion of the argument (•) (i.e. frc($10/8$)=2). In the example illustrated in FIG. 4, $$O1 = 512 * \text{rem}\left(\frac{10-1}{8}\right) = 512$$

Therefore, the starting offset value and physical sector for the write data P1, O1 in the illustrated example is (2, 512).

Next, a value for the ending physical sector P2 and the ending offset are determined according to the following relations:

$$P2 = \text{int}\left[\frac{(M+S-2)}{N}\right] + 1$$

and $$O2 = K * \text{rem}\left[\frac{(M+S-2)}{N}\right]$$

This process is illustrated in blocks 506 and 508, respectively, of FIG. 5.

Figure 6:
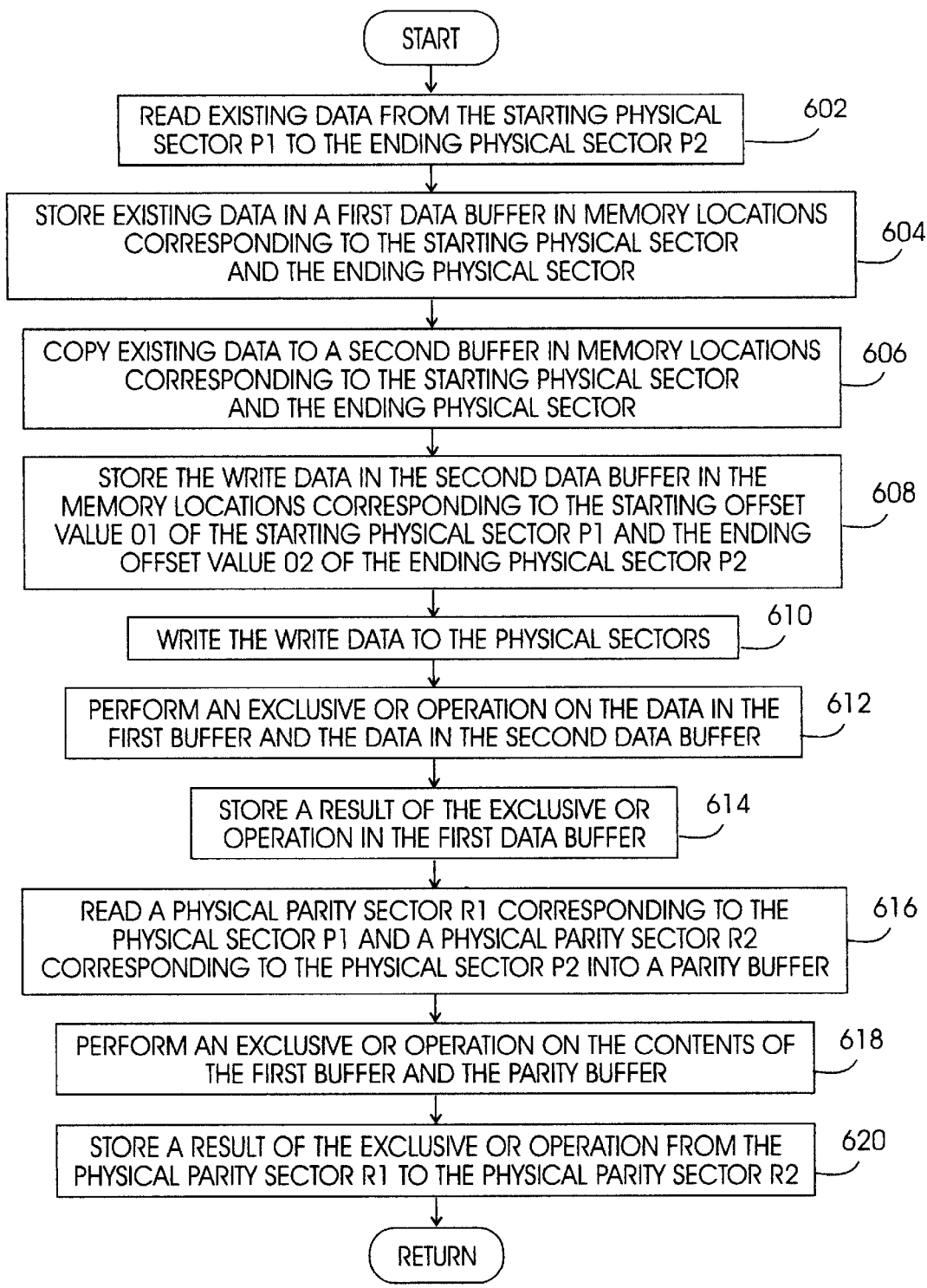
FIG. 6 is a flow chart showing the operations used in writing data to a data storage disk using existing data read from the storage disk for a RAID parity calculation.
Figure 7:
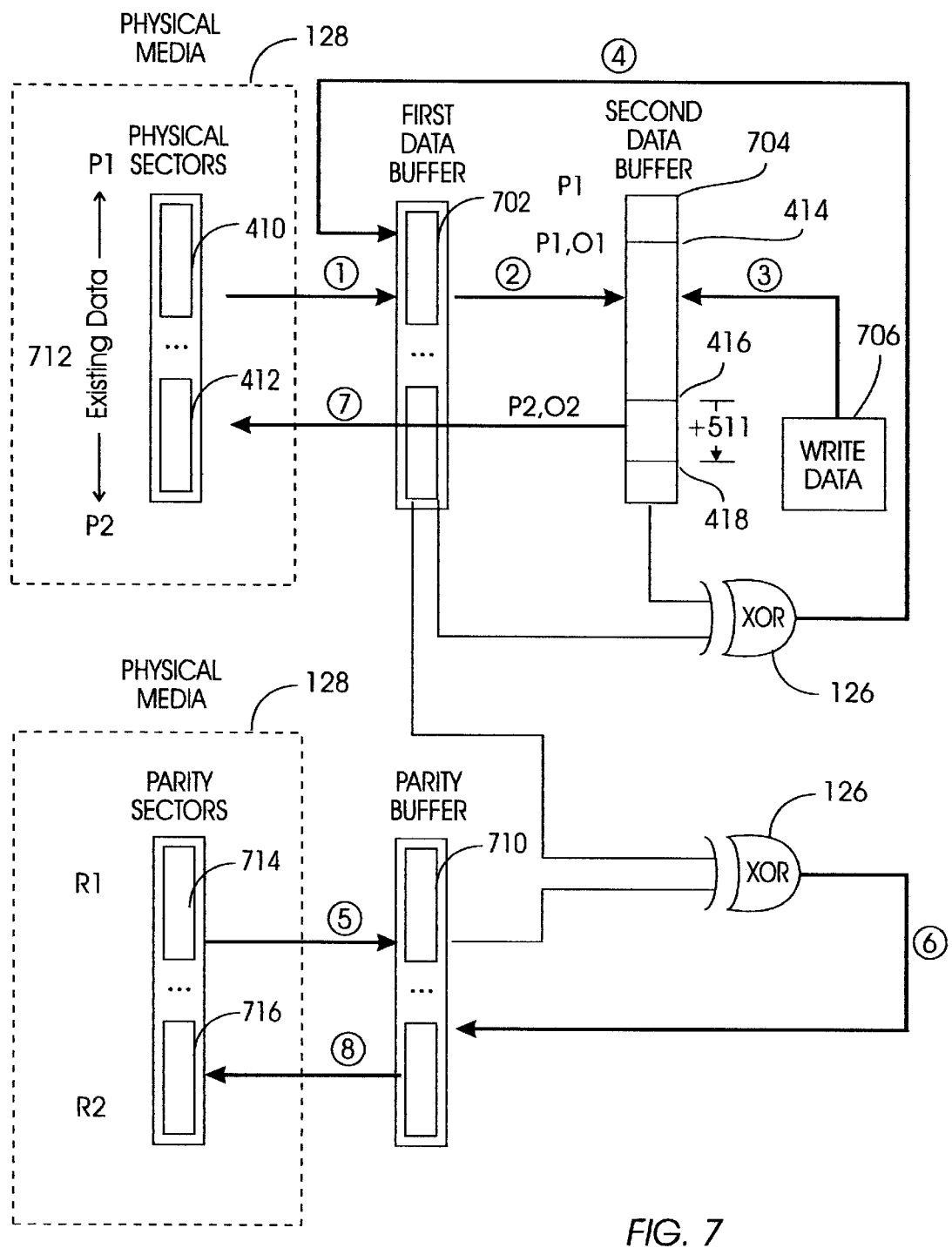
FIG. 7 is a diagram showing the relationship writing process and elements of the RAID array.

FIGS. 6 and 7 are diagrams presenting additional detail regarding the foregoing operations. The process begins by reading existing data 712 from the media device from the starting physical sector P1 410 to the ending physical sector 412. This is illustrated in block 602. Next, this existing data 712 is stored in a first data buffer 702 in memory locations corresponding to the starting physical sector 410 and the ending physical sector 412. This is illustrated in block 604 of FIG. 6 and in FIG. 7 as step (1). The existing data 712 is then copied to a second data buffer 704, starting from sector P1 410, through intervening physical sectors between P1 410 and P2 412, and including P2 412. This is illustrated in block 606 and step (2). Next, the received write data 706 is stored in the second data buffer 704 in the memory locations corresponding to the mapped starting offset of the starting physical sector 414 and ending offset of the ending physical sector 416. Because the ending offset of the ending physical sector 416 corresponds to the beginning address of the associated user sector 408, data in this last user sector 408 is written to the 511 bytes that follow the ending offset of the ending physical sector 416. This is depicted in block 608 of FIG. 6 and step (3) in FIG. 7. The write data in the second data buffer 704 can be written to the physical media 128 in physical sectors P1 through and including P2 at this time, or after parity is established. FIG. 6 illustrates the completion of this step before the parity computations. FIG. 7 depicts the writing step occurring after parity computations are completed.

An EXCLUSIVE OR operation is then performed on the data in the first buffer 702 and the second data buffer 704, and the results are stored in the first data buffer 702. This is depicted in blocks 612 and 614 of FIG. 6 and in step (4) of FIG. 7. Parity data from physical parity sectors R1 714 and R2 716 corresponding to the physical sectors P1 410 and P2 412 are then read from a storage device performing parity functions for data stored from P1 to P2 in a parity buffer 710. This is illustrated in block 616 of FIG. 6 and step (5) of FIG. 7. An EXCLUSIVE OR operation is then performed on the data in the first data buffer 702 and the parity buffer 710. This is depicted in block 618 of FIG. 6.

Next, if the write data has not already been written to the physical media 128, the write data is written from the second data buffer 704 to the physical sectors 410–412 and those physical sectors therebetween. This is depicted as step (7) in FIG. 7. Then, the EXCLUSIVE OR of the first data buffer 702 and the parity buffer 710 is stored in the parity buffer 710 and to the physical parity sector R1 714 to the physical parity sector R2 716. This is depicted in block 620 and as steps (6) and (8) in FIG. 7.

Figure 8:
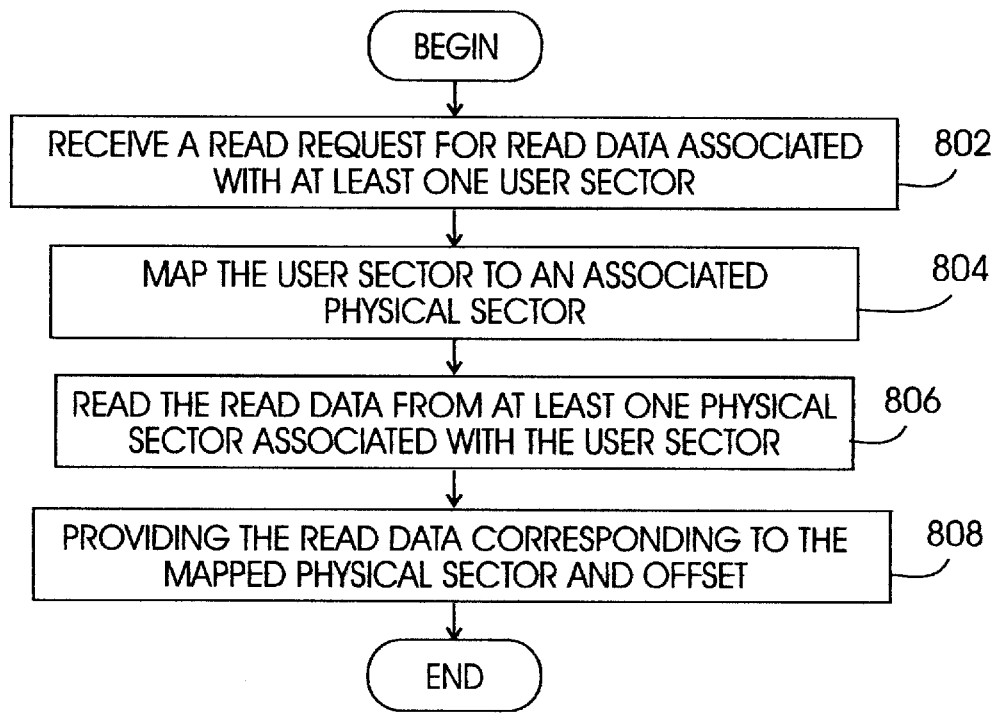
FIG. 8 is a flow chart illustrating the operations performed to read data.

FIG. 8 is a flow chart illustrating the operations performed in reading data. First, a read request associated with at least one user sector is received 802 from the host computer 102. Although the data identified by the read request was stored in physical sectors 404, it appears and is identified to the user as if it were stored in user sectors 402. Therefore, the user sectors 402 for the read data must be mapped into associated physical sectors 404. This is illustrated in block 804. After this mapping is completed, the read data is read 806 from the associated physical sector(s). The read data corresponding to the mapped physical sectors and offsets is then extracted, and provided to the host computer 102. This is illustrated in block 808.

Figure 9:
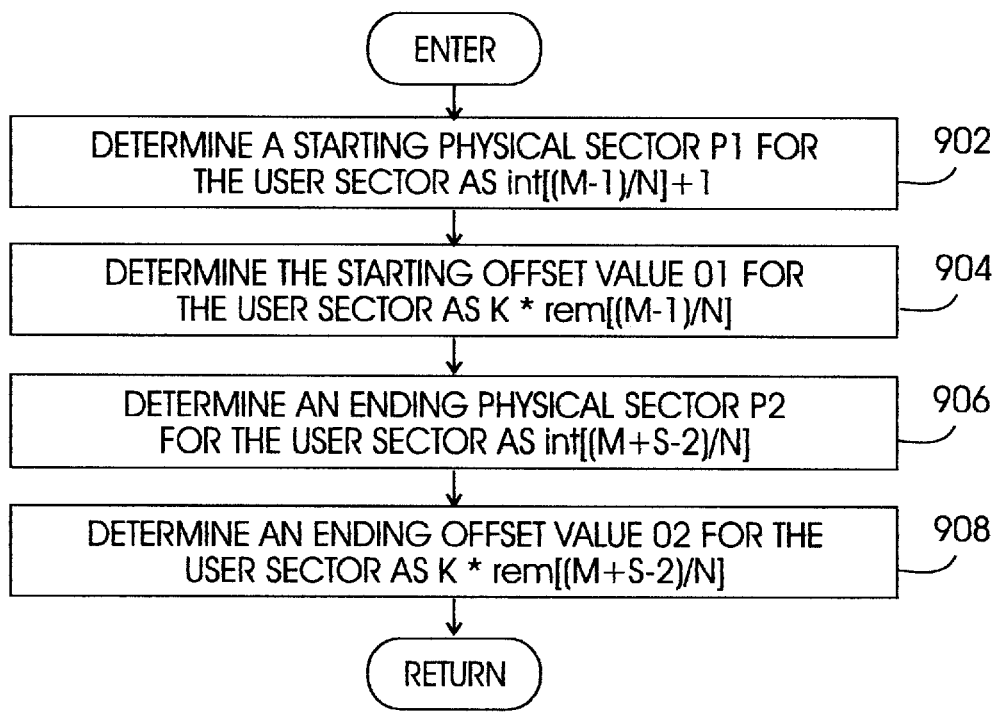
FIG. 9 is a flow chart further illustrating the operations performed in mapping user sector data addresses to physical sector data addresses.

FIG. 9 is a flow chart illustrated the operations performed in mapping the user sectors 402 to the physical sectors 404. The steps involved use principles similar to those used to write data to the disk. First, the starting physical sector P1 for the read is determined by fining the value of:

$$P1 = \text{int}\left[\frac{(M-1)}{N}\right] + 1$$

where M, N, and the function int(•) are as defined previously. This is illustrated in block 902. Then, the starting offset value O1 of the starting byte for the requested data is determined from $$O1 = K * \text{rem}\left[\frac{(M-1)}{N}\right]$$

where M, N, and the function rem(•) are as previously defined. This is illustrated in block 904. These steps are repeated to obtain P2 and O2, the physical sector and offset representing the last user sector to be read, according to the following relationships:

$$P2 = \text{int}\left[\frac{(M+S-2)}{N}\right] + 1$$

and $$O2 = K * \text{rem}\left[\frac{(M+S-2)}{N}\right]$$

These steps are illustrated in blocks 906 and 908. Data is then read from physical sector P1 to physical sector P2 into a buffer 118 in the controller 110. The entity requesting the read data (here the host computer 102) is then provided the data beginning from offset O1 in sector P1, and ending in offset O2 plus 511 bytes in sector P2, and all intervening physical sectors.

Conclusion

This concludes the description of the preferred embodiments of the present invention. In summary, the present invention describes a method, apparatus, article of manufacture, and a memory structure for storing and retrieving data in physical sectors which are larger than the sector size presented to the user. The method comprises the steps of receiving at least one user sector comprising write data, and writing the user sector to a portion of the physical sector of the storage device. In one embodiment, data is written to the data storage disk using existing data that was read from the storage disk for a RAID parity calculation. In writing the data in this way, larger sector sizes can be implemented with no overhead penalty.

The method comprises the steps of mapping user sectors to associated physical sectors, reading the existing data stored in the associated physical sectors, merging the write data with the existing data stored in the associated physical sector, and writing the merged data to the storage device. In one embodiment, the method further comprises the steps of computing a data delta from the existing data and the write data, computing a parity value for the write data from the data delta and a parity of the existing data, and writing the write data to the mapped physical sector.

The apparatus comprises a plurality of storage devices, each comprising media segmented into a plurality of physical sectors, operatively coupled to a controller. The controller manages the storage and retrieval of data in the storage devices and comprises an I/O module for writing user sectors to physical sectors. The article of manufacture comprises a data storage device tangibly embodying instructions to perform the method steps described above. The present invention also describes a memory for storing data in a RAID array of storage disks. The memory is structured into a plurality of physical sectors, typically 4096 bytes long, each of which is associable via a mapping with eight 512 byte user sectors. Data is written to the physical sectors using existing data read from a storage disk during the RAID parity calculation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of storing data in a storage device, comprising the steps of:

receiving at least one user sector comprising the write data; and writing the user sector to a portion of a physical sector of the storage device including the substeps of:

mapping the user sector to at least one associated physical sector including the substeps of:

determining a starting physical sector value P1 for the user sector as the integer value of $((M-1)/N)+1$, wherein M is a value designating a first user sector;

determining a starting offset value O1 for the user sector as the product of K and a remainder of $(M-1)/N$;

determining an ending physical sector number P2 for the user sector as the integer value of $((M+S-2)/N)+1$; and determining an ending offset for the user sector O2 as the product of K and the remainder of $((M+S-2)/N)$;

reading existing data stored in the associated physical sector;

merging the write data with the existing data stored in the associated physical sector; and writing the merged data to the associated physical sector;

wherein the physical sector includes a multiple of user sectors and each physical sector is associable with N user sectors and the write data spans S user sectors of K bytes.

2. The method of claim 1, wherein the user sector is written to the physical sector using existing data read from the storage device for a RAID parity calculation.

3. The method of claim 1, further comprising the steps of:

computing a data delta from the existing data and the write data;

computing a parity value for the write data from the data delta and a parity of the existing data; and writing the parity value to a parity disk.

4. The method of claim 3, wherein the data delta comprises an EXCLUSIVE OR of the write data and the existing data, and the parity value comprises an EXCLUSIVE OR of the existing data and parity data for the existing data.

5. The method of claim 1, wherein the step of writing the merged data to the associated physical sector comprises the steps of:

reading the existing data from the starting physical sector to the ending physical sector;

storing the existing data in a first data buffer in memory locations corresponding to the starting physical sector and the physical sector;

copying the existing data to a second data buffer in memory locations corresponding to the starting physical sector and ending physical sector;

storing the write data in the second data buffer in the memory locations corresponding to the starting offset value O1 of the starting physical sector P2 and the ending offset value O2+(K−1) of the ending physical sector P2; and writing the write data from the physical sector P1 to the physical sector P2.

6. The method of claim 5, further comprising the steps of:

computing a data delta from the existing data and the write data, including the steps of performing an EXCLUSIVE OR operation on the data in the first data buffer and the second data buffer, and storing a result of the EXCLUSIVE OR operation in the first data buffer;

computing a parity value for the write data from the data delta and a parity of the existing data; and writing the parity value to a parity disk.

7. The method of claim 6, wherein the step of computing a parity value for the write data from the data delta and a parity of the existing data comprises the steps of:

reading a parity data from a physical parity sector R1 to a physical parity sector R2 into a parity buffer, wherein the physical parity sectors R1 and R2 correspond to the physical sectors P1 and P2; and performing an EXCLUSIVE OR operation on the contents of the first buffer and the parity buffer; and storing a result of the EXCLUSIVE OR operation from the physical parity sector R1 to the physical parity sector R2.

8. A method of reading data in a RAID array of data storage devices, each disk segmentable into a plurality of physical sectors associable with N user sectors, comprising the steps of:

receiving a read request for read data associated with at least one user sector;

mapping the user sector to at least one associated physical sector and an offset within the at least one physical sector including the substeps of:

determining a starting physical sector P1 for the user sector as the integer value of ((M−1)/N)+1, wherein M is a value designating the user sector;

determining a starting offset value O1 for the user sector as the product of K and a remainder of (M/N);

determining an ending physical sector number P2 for the user sector as the integer value of ((M+S−2)/N)+1; and determining an ending offset value O2 for the user sector as the product of K and the remainder of (M+S−2)/N;

reading the read data from the mapped physical sector; and providing the read data corresponding to the mapped physical sector and the offset;

wherein the physical sector includes a multiple of user sectors and the read data spans S user sectors of K bytes.

9. The method of claim 8, wherein the step of reading the read data from the associated physical sector comprises the steps of reading the read data from starting physical sector P1 to the ending physical sector P2.

10. The method of claim 8, wherein the step of providing the read data corresponding to the mapped physical sector and the offset comprises the steps of providing the read data from the starting offset value O1 of the starting physical sector P1 to the ending offset value O2+(K−1) of the ending physical sector.

11. An apparatus for storing and retrieving data, comprising:

a plurality of storage devices, each comprising media segmented into a plurality of physical sectors;

a controller, operatively coupled to the storage devices, for managing storage and retrieval of the data in the data storage devices, wherein the controller comprises an I/O module for writing at least one user sector to a storage device media from a first offset within a first physical sector in a second offset within a second physical sector, wherein the controller performs the steps of:

mapping the user sector to at least one associated physical sector, comprising the substeps of:

determining a starting physical sector value P1 for the user sector as the integer value of ((M−1)/N)+1, wherein M is a value designating a first user sector;

determining a starting offset value O1 for the user sector as the product of K and a remainder of (M−1)/N;

determining an ending physical sector number P2 for the user sector as the integer value of ((M+S−2)/N)+1; and determining an ending offset for the user sector O2 as the product of K and the remainder of ((M+S−2)/N);

reading existing data stored in the associated physical sector;

merging the write data with the existing data stored in the associated physical sector; and writing the merged data to the associated physical sector;

wherein the physical sector includes a multiple of the user sectors and each physical sector is associable with N user sectors and the write data spans S user sectors of K bytes.

12. The apparatus of claim 11, wherein the I/O module comprises a mapper for translating a user sector into a physical sector and an offset.

13. The apparatus of claim 11, wherein the plurality of storage devices and the controller comprise a RAID array.

14. An apparatus for storing data in a storage device, comprising:

means for receiving at least one user sector comprising the write data; and means for writing the user sector to a portion of a physical sector of the storage device, comprising:

means for mapping the user sector to at least one associated physical sector, comprising:

means for determining a starting physical sector value P1 for the user sector as the integer value of ((M−1)/N)+1, wherein M is a value designating a first user sector;

means for determining a starting offset value O1 for the user sector as the product of K and a remainder of (M−1)/N;

means for determining an ending physical sector number P2 for the user sector as the integer value of (M+S−2)/N)+1; and means for determining an ending offset for the user sector O2 as the product of K and the remainder of ((M+S−2)/N);

means for reading existing data stored in the associated physical sector;

means for merging the write data with the existing data stored in the associated physical sector; and means for writing the merged data to the associated physical sector;

wherein the physical sector includes a multiple of user sectors and each physical sector is associable with N user sectors and the write data spans S user sectors of K bytes.

15. The apparatus of claim 14, wherein the user sector is written to the physical sector using existing data read from the storage device for a RAID parity calculation.

16. The apparatus of claim 15, further comprising:

means for computing a data delta from the existing data and the write data;

means for computing a parity value for the write data from the data delta and a parity of the existing data; and means for writing the parity value to a parity disk.

17. The apparatus of claim 16, wherein the data delta comprises an EXCLUSIVE OR of the write data and the existing data, and the parity value comprises an EXCLUSIVE OR of the existing data and parity data for the existing data.

18. The apparatus of claim 14, wherein the means for writing the merged data to the associated physical sector comprises:

means for reading the existing data from the starting physical sector to the ending physical sector;

means for storing the existing data in a first data buffer in memory locations corresponding to the starting physical sector and the physical sector;

means for copying the existing data to a second data buffer in memory locations corresponding to the starting physical sector and ending physical sector;

means for storing the write data in the second data buffer in the memory locations corresponding to the starting offset value O1 of the starting physical sector P2 and the ending offset value O2+(K−1) of the ending physical sector P2; and means for writing the write data from the physical sector P1 to the physical sector P2.

19. The apparatus of claim 18, further comprising:

means for computing a data delta from the existing data and the write data, including the steps of performing an EXCLUSIVE OR operation on the data in the first data buffer and the second data buffer, and storing a result of the EXCLUSIVE OR operation in the first data buffer;

means for computing a parity value for the write data from the data delta and a parity of the existing data; and means for writing the parity value to a parity disk.

20. The apparatus of claim 19, wherein the means for computing a parity value for the write data from the data delta and a parity of the existing data comprises:

means for reading a parity data from a physical parity sector R1 to a physical parity sector R2 into a parity buffer, wherein the physical parity sectors R1 and R2 correspond to the physical sectors P1 and P2;

means for performing an EXCLUSIVE OR operation on the contents of the first buffer and the parity buffer; and means for storing a result of the EXCLUSIVE OR operation from the physical parity sector R1 to the physical parity sector R2.

21. An apparatus for reading data in a RAID array of data storage devices, each disk segmentable into a plurality of physical sectors associable with N user sectors, comprising:

means for receiving a read request for read data associated with at least one user sector;

means for mapping the user sector to at least one associated physical sector and an offset within the at least one physical sector, comprising:

means for determining a starting physical sector P1 for the user sector as the integer value of ((M−1)/N)+1, wherein M is a Value designating the user sector;

means for determining a starting offset value O1 for the user sector as the product of K and a remainder of (M/N);

means for determining an ending physical sector number P2 for the user sector as the integer value of ((M+S−2)/N)+1; and means for determining an ending offset value O2 for the user sector as the product of K and the remainder of (M+S−2)/N;

means for reading the read data from die mapped physical sector; and means for providing the read data corresponding to the mapped physical sector and the offset;

wherein the physical sector includes a multiple of user sectors and the read data spans S user sectors of K bytes.

22. The apparatus of claim 21, wherein the means for reading the read data from the associated physical sector comprises means for reading the read data from starting physical sector P1 to the ending physical sector P2.

23. The apparatus of claim 21, wherein the means for providing the read data corresponding to the mapped physical sector and the offset comprises means for providing the read data from the starting offset value O1 of the starting physical sector P1 to the ending offset value O2+(K−1) of the ending physical sector.

24. An article of manufacture, embodying logic to perform method steps of storing data in a storage device, the method steps comprising the steps of:

receiving at least one user sector comprising the write data; and writing the user sector to a portion of a physical sector of the storage device, comprising the substeps of:

mapping the user sector to at least one associated physical sector, comprising the substeps of:

determining a starting physical sector value P1 for the user sector as the integer value of ((M−1)/N)+1, wherein M is a value designating a first user sector;

determining a starting offset value O1 for the user sector as the product of K and a remainder of (M−1)/N;

determining an ending physical sector number P2 for the user sector as the integer value of ((M+S−2)/N)+1; and determining an ending offset for the user sector O2 as the product of K and the remainder of ((M+S−2)/N);

reading existing data stored in the associated physical sector;

merging the write data with the existing data stored in the associated physical sector; and writing the merged data to the associated physical sector;

wherein the physical sector includes a multiple of user sectors and each physical sector is associable with N user sectors and the write data spans S user sectors of K bytes.

25. The article of manufacture of claim 24, wherein the user sector is written to the physical sector using existing data read from the storage device for a RAID parity calculation.

26. The article of manufacture of claim 24, wherein the method steps further comprise the method steps of:
computing a data delta from the existing, data and the write data;
computing a parity value for the write data from the data delta and a parity of the existing data; and
writing the parity value to a parity disk.

27. The article of manufacture of claim 26, wherein the data delta comprises an EXCLUSIVE OR of the write data and the existing data, and the parity value comprises an EXCLUSIVE OR of the existing data and parity data for the existing data.

28. The article of manufacture of claim 24, wherein the method step of writing the merged data to the associated physical sector comprises the method steps of:
reading the existing data from the starting physical sector to the ending physical sector;
storing the existing data in a first data buffer in memory locations corresponding to the starting physical sector and the physical sector;
copying the existing data to a second data buffer in memory locations corresponding to the starting physical sector and ending physical sector;
storing the write data in the second data buffer in the memory locations corresponding to the starting offset value O1 of the starting physical sector P2 and the ending offset value O2+(K−1) of the ending physical sector P2; and
writing the write data from the physical sector P1 to the physical sector P2.

29. The article of manufacture of claim 28, wherein the method steps further comprise the method steps of:
computing a data delta from the existing data and the write data, including the steps of performing an EXCLUSIVE OR operation on the data in the first data buffer and the second data buffer, and storing a result of the EXCLUSIVE OR operation in the first data buffer;
computing a parity value for the write data from the data delta and a parity of the existing data; and
writing the parity value to a parity disk.

30. The article of manufacture of claim 29, wherein the method step of computing a parity value for the write data from the data delta and a parity of the existing data comprises the method steps of:
reading a parity data from a physical parity sector R1 to a physical parity sector R2 into a parity buffer, wherein the physical parity sectors R1 and R2 correspond to the physical sectors P1 and P2; and
performing an EXCLUSIVE OR operation on the contents of the first buffer and the parity buffer; and
storing a result of the EXCLUSIVE OR operation from the physical parity sector R1 to the physical parity sector R2.

31. An article of manufacture, embodying logic to perform method steps of reading data in a RAID array of data storage devices, each disk segmentable into a plurality of physical sectors associable with N user sectors, the method steps comprising the steps of:
receiving a read request for read data associated with at least one user sector;
mapping the user sector to at least one associated physical sector and an offset within the at least one physical sector, comprising the substeps of:
determining a starting physical sector P1 for the user sector as the integer value of $((M-1)/N)+1$, wherein M is a value designating the user sector;
determining a starting offset value O1 for the user sector as the product of K and a remainder of $(M/N)$;
determining an ending physical sector number P2 for the user sector as the integer value of $((M+S-2)/N)+1$; and
determining an ending offset value O2 for the user sector as the product of K and the remainder of $(M+S-2)/N$;
reading the read data from the mapped physical sector; and
providing the read data corresponding to the mapped physical sector and the offset;
wherein the physical sector includes a multiple of user sectors and the read data spans S user sectors of K bytes.

32. The article of manufacture of claim 31, wherein the method step of reading the read data from the associated physical sector comprises the method steps of reading the read data from starting physical sector P1 to the ending physical sector P2.

33. The article of manufacture of claim 31, wherein the method step of providing the read data corresponding to the mapped physical sector and the offset comprises the method steps of providing the read data from the starting offset value O1 of the starting physical sector P1 to the ending offset value O2+(K−1) of the ending physical sector.

34. A memory for storing data in a RAID array of storage devices accessible by a computer, wherein memory is presented to a user as a plurality of user sectors, the memory comprising:
plurality of physical sectors, each associable with N user sectors; and
wherein each of the user sectors are written to a portion of a physical sector of the storage device by the steps of:
mapping the user sector to at least one associated physical sector, comprising the substeps of:
determining a starting physical sector value P1 for the user sector as the integer value of $((M-1)/N)+1$, wherein M is a value designating a first user sector;
determining a starting offset value O1 for the user sector as the product of K and a remainder of $(M-1)/N$;
determining an ending physical sector number P2 for the user sector as the integer value of $((M+S-2)/N)+1$; and
determining an ending offset for the user sector O2 as the product of K and the remainder of $((M+S-2)/N)$;
reading existing data stored in the associated physical sector;
merging the write data with the existing data stored in the associated physical sector; and
writing the merged data to the associated physical sector;
and wherein the physical sector includes a multiple of user sectors and the write data spans S user sectors of K bytes.

* * * * *